F. L. JEFFERIES.
PROCESS OF STEEPING GRAIN IN THE MANUFACTURE OF STARCH.
APPLICATION FILED FEB. 6, 1911.
1,007,782.
Patented Nov. 7, 1911.
2 SHEETS—SHEET 1.
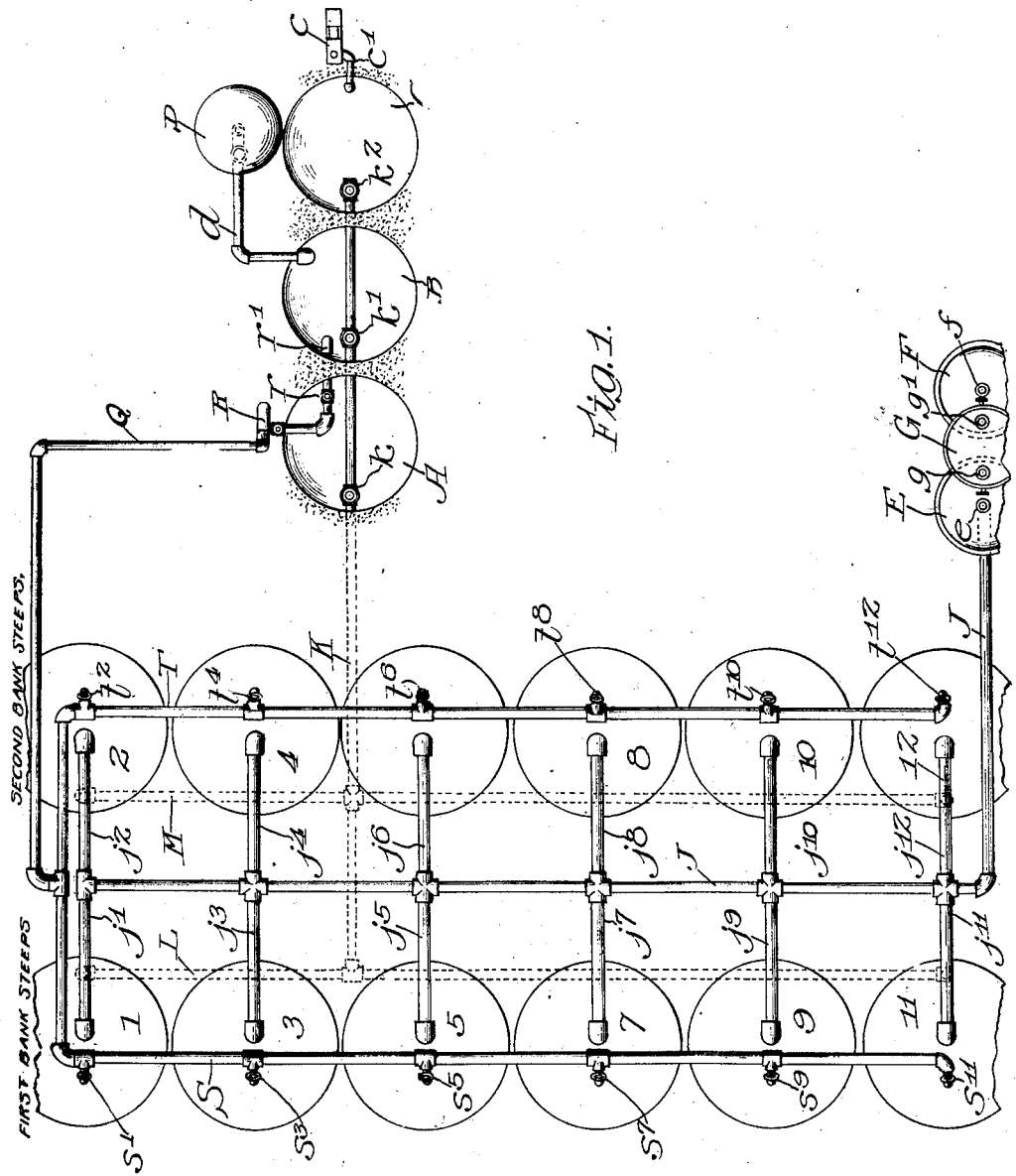

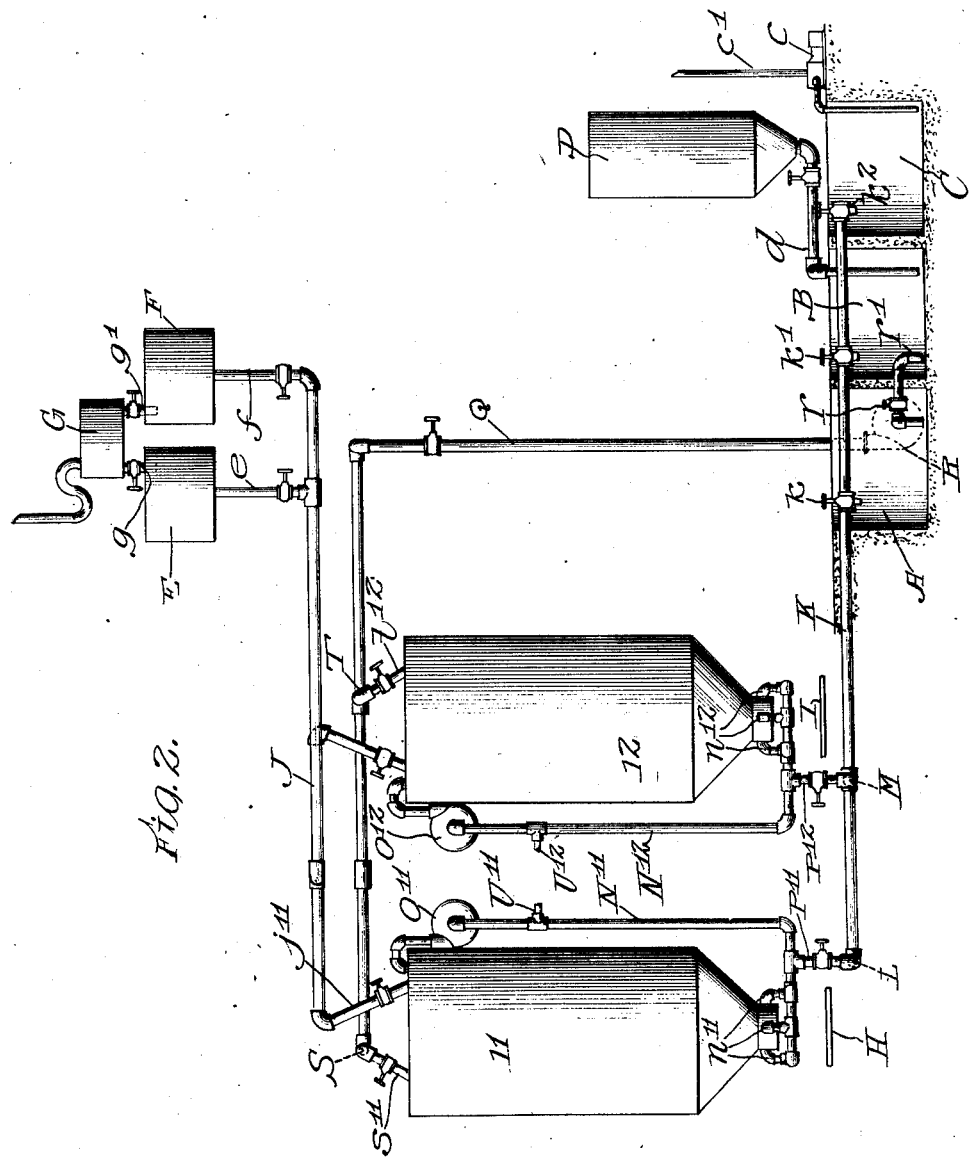

UNITED STATES PATENT OFFICE.

FREDRICK LESTER JEFFERIES, OF GRANITE CITY, ILLINOIS, ASSIGNOR TO CORN PRODUCTS REFINING COMPANY, A CORPORATION OF NEW JERSEY.

PROCESS OF STEEPING GRAIN IN THE MANUFACTURE OF STARCH.

1,007,782. Specification of Letters Patent. Patented Nov. 7, 1911.

Application filed February 6, 1911. Serial No. 606,893.

*To all whom it may concern:*

Be it known that I, FREDRICK L. JEFFERIES, a citizen of the United States, residing at Granite City, in the county of Madison and State of Illinois, have invented certain new and useful Improvements in Processes of Steeping Grain in the Manufacture of Starch, of which the following is a specification.

My invention relates to the manufacture of starch from corn and particularly to the steeping of the grain before it goes to the mills for the purpose of softening it and extracting therefrom certain soluble substances which are valuable as by-products; and the invention has for its object to provide certain novel and improved methods, to be hereinafter described, for carrying out this steeping operation.

The process is carried out by providing a plurality of steep tanks, which may be of the sort customarily used for steeping the grain, filling these steeps with corn and subjecting the bodies of corn therein to a succession of periodic steeping operations with bodies of steeping liquid which, in the case of any given body of grain, are relatively heavy with soluble substances derived from the use of said liquid in previous operations but which are relatively more dilute as the operation on such body of grain progresses. When the corn in a given tank has gone through the full cycle of these periodic steeping operations it is drained, and the steeping liquid, which has reached a maximum of concentration, is withdrawn from the system and sent to the evaporators. The steeped corn is then removed from the steep tank. At the same time the bodies of steeping liquid on each of the partially steeped bodies of grain in the other steep tanks of the series are withdrawn successively and introduced into the next succeeding steep tanks of the series, that is, in contact, in each case, with a body of grain relatively fresher than that from which they have just been withdrawn. The fresh liquid is introduced into the tank containing the oldest corn. The process is made a circular or continuous one by filling up the steep tanks which have been emptied with fresh bodies of corn, and, when each series of changes of the bodies of liquid is made, applying the heaviest liquid from the body of corn which has been steeped for the shortest time to the fresh body of grain before such liquid leaves the system for the evaporator. The advantages of steeping the corn in this manner are, among others, a much increased yield of soluble matters, a more concentrated solution for the evaporators, more uniform steeping, a reduction in the amount of water used and in the number of steeps, and, generally speaking, a more efficient, economical and convenient method of carrying out the steeping of the grain.

I am aware that a steeping system has been devised in which the steeping liquid passes continuously and uninterruptedly through a series of steeps containing bodies of grain which are progressively fresher as the continuous stream of steeping liquid becomes more concentrate. My process, however, involves, as stated, subjecting the bodies of grain to successive periodic steeping operations with separate bodies of liquid applied and withdrawn from each body of corn at intervals. In other words, the process retains the old idea of treating the corn in each of the steeps for a considerable period of time with the same body of steeping liquid, which permits separate circulations to be maintained through the individual tanks, while at the same time utilizing the method of causing each body of grain to be steeped with liquid which is progressively lighter as the operation proceeds.

In addition to permitting the independent circulations through the individual tanks, the present process is capable of being carried out so as to produce results which are exactly calculable, since the steep water is withdrawn from each of the steeps before it is introduced into the next one of the series.

The apparatus employed for carrying out the process may be comparatively simple and economical in its construction.

The preferred method of carrying out the process will be best understood by reference to the accompanying drawings which show a suitable form of apparatus for this purpose.

In these drawings, Figure 1 is a plan view, and Fig. 2, an end view with parts shown in section.

Like characters of reference indicate like parts in the several figures of the drawings.

Referring to the drawings, 1 to 12 inclusive designate a battery of steep tanks of any desired construction, the battery being preferably divided into two banks of six tanks each with the odd numbered tanks in one bank and the even numbered in the other. The process contemplates making the changes in the steeping liquid only as between the tanks of a bank and first making the changes on one bank and then those on the other. It will be obvious however that all of the tanks might be operated in a single series, or, on the other hand, that if need be they might be divided into more than two banks or sets. Furthermore, the number of the tanks in the battery is not important; the number will be increased or decreased according to the amount of the material handled.

A and B designate two change cisterns; C a discharge tank in which the concentrated liquor is received, and D a wash water tank, which will be used in the event that the steeped grain is to be washed before it goes to the mills. This is not necessary under all circumstances.

E and F designate sulfur tanks supplied from a tank G having valved discharge pipes $g$, $g'$.

H and I designate conveyers, which are conventionally represented, and are located under respectively the two banks of steep tanks, these conveyers being adapted to carry off the steeped grain to the mills. The odd numbered steeps will be referred to as the first bank and the even numbered steeps as the second bank.

The sulfur water is conducted from the tanks E or F through branch pipes $e$, $f$ and a pipe J having valved branches $j'$ $j^2$ et cetera, discharging into the several steep tanks respectively. A pipe K, having the two feeders L and M for respectively the first and second bank of steeps, conducts the liquor from the steeps to either one of the change cisterns A and B, or to the discharge tank C, as may be desired; pipe K being provided with the discharge nozzles $k$, $k'$, $k^2$ discharging into respectively cisterns A and B and tank C. Each steep tank has a circulating pipe for conducting the liquid from the bottom of the tank back to the top. This arrangement is shown in Fig. 2 in which tanks 11 and 12 are shown as provided with the circulating pipes $N^{11}$ and $N^{12}$ into which open the branch pipes $n^{11}$, $n^{12}$ from the bottom of the respective steeps. Pumps $O^{11}$, $O^{12}$ are interposed in the circulation pipes $N^{11}$, $N^{12}$ respectively. Pipes $N^{11}$, $N^{12}$ are connected respectively with the feeders L and M by the valved pipes $P^{11}$, $P^{12}$ respectively. It will be understood that similar arrangements exist with respect to the other steeps.

Q is a pipe fed by a pump R from change cisterns A and B, the pump having the two valve controlled inlets $r$ and $r'$ leading from the change cisterns respectively. The wash water from tank D enters change cistern B through a valved pipe $d$. A pump $c$ and pipe $c'$ takes the liquid from the discharge tank C to the evaporators or elsewhere, as may be desired. Pipe Q has the two branches S and T extending over the respective banks of steeps and discharging into the same through valved discharge pipes $s$, $s^3$, $s^5$, $s^7$, $s^9$, $s^{11}$, and $t^2$, $t^4$, $t^6$, $t^8$, $t^{10}$, $t^{12}$, respectively.

The temperature of the steeps is maintained at the desired point by the introduction of steam into the circulating pipes as indicated at $U^{11}$, $U^{12}$ in Fig. 2.

While the apparatus is a suitable, convenient and economical form of apparatus for carrying out the process it will be obvious that the process might be practiced by apparatus of different construction. The carrying out of the process may be described as performed in cycles. In each cycle the corn in one steep of each bank finishes its steeping operation and is cut out of the system ready for grinding, and a new body of corn is added to the system. In each cycle the steep liquid in each steep tank is shifted to the next tank of its series or bank. With a battery of twelve steeps arranged in two banks, as shown, the various operations constituting a given cycle may be performed in ten periods divided into two half cycles of five periods each. During the first half cycle the steep water is changed on one bank of steeps. It is changed on the other bank of steeps during the second half cycle.

Assuming that the process has been carried on for sufficient time to bring the whole battery of steeps into operation, the description of the several operations making up one cycle may be commenced with the steeps in the following condition: 1 has just finished steeping, the steep water has been withdrawn and the corn therein is ready to go to the mills. 12 is just ground out. 2 has been steeping for the longest period and will be next to grind. 3 contains the next oldest corn and is drained out ready for fresh sulfur water (a dilute solution of sulfurous acid) or other suitable steeping liquid. The rest of the tanks are filled with steep water of progressively increasing density.

The operations performed in the cycle which comes next are as follows:

*First half cycle.*—Corn is removed from steep tank 1 going to the mills. At some time during the half cycle tank 3 receives fresh sulfur water from one or other of tanks E and F through pipe J and branch pipe $j^3$. Tanks 5, 7, 9 and 11 stand filled with bodies of steep water which are not changed during this half cycle. Separate circulations may, however, be maintained through these steeps during this interval and also through all of the other steeps during all of the intervals in which they are filled with the steeping liquid. If the corn in 1 is to be washed before going to the mills fresh water is pumped onto it from the cistern B filled, as shown, from tank D. This can be done at any convenient time during the half cycle or the latter part of the previous cycle. The water may be drained off, at a convenient time, into tank C and thence removed.

*First period.*—Steep 12, which was empty at the beginning of the cycle, is filled with fresh corn in any suitable manner. 10 drains to tank C. 10 contains the freshest corn in the second bank and the oldest steep water which is then withdrawn from the system to the evaporators. The steep liquor in 8 goes to change cistern A. 8 contains the next freshest corn and the next oldest steep water. Steeps 6, 4 and 2 are unchanged.

*Second period.*—The steep liquid in A—just received from 8—goes to tank 12 which is filled, or has just been filled, with fresh corn. The steep water in 6 goes to B, the other change cistern. Steeps 4 and 2 are filled with steep water which is unchanged. 10 and 8 stand without any liquid in them.

*Third period.*—The steep water in B—just filled from 6—goes to steep 10. The steep water in 4 goes to A. 2 and 12 steep without change. 8 and 6 stand emptied of liquid.

*Fourth period.*—The steep water in A—just filled from 4—goes to steep 8. The liquid in 2 goes to B. 12 and 10 steep without change. 4 and 6 stand emptied of liquid.

*Fifth period.*—The steep water in B—just filled from 2—goes to 6. 12, 10 and 8 steep without change. 2 is ready to grind out. 4 is emptied of its steep liquid and stands ready for fresh sulfur water during the first half of the next cycle.

It will be seen that during the above described first half cycle the steep liquid is shifted from each one of the tanks of the second bank to the second succeeding tank. The grain longest steeped is cut out of the system ready for grinding, the oldest batch of steep water withdrawn from the system, and the next oldest batch put on the fresh batch of grain.

*Second half cycle.*—The grain in steep 2 goes to the mills—after first having been washed with fresh water as above described in connection with steep 1 when this operation is necessary—4 receives fresh sulfur water from tank E or F. Tanks 12, 10, 8 and 6 steep without change during the entire half cycle.

*Sixth period.*—1 is filled with corn—just as 12 was filled during the previous half cycle—11 drains to the discharge tank C. 11 contains the freshest grain in bank 1 and the oldest steep water. The steep water in 9 goes to cistern A. 9 contains the next oldest steep water and the next freshest grain in the first bank. 7, 5 and 3 steep without change.

*Seventh period.*—The steep water in A—just filled from 9—goes to 1 which is filling, or has just been filled, with fresh grain. The steep water in 7 goes to B. 5 and 3 steep without change. 11 and 9 stand emptied of liquid.

*Eighth period.*—Steep water in B—just filled from 7—goes to 11. The steep water in 5 goes to A. 3 and 1 steep without change. 9 and 7 stand empty of liquid.

*Ninth period.*—The steep water in A—just filled from 5—goes to 9. Steep water in 3 goes to B. 1 and 11 steep without change. 7 and 5 stand emptied of liquid.

*Tenth period.*—Steep water in B—just filled from 3—goes to 7. 1, 11 and 9 steep without change. 5 stands ready for fresh sulfur water which it will receive during the next half cycle, and 3 is ready to grind out during the next half cycle.

It will be seen that in the second half cycle, above described, the steep water on each of the tanks of the first bank is changed to the second succeeding tank; that the tank containing the oldest grain is cut out ready for grinding; that the most concentrated batch of steep water is withdrawn from the system; and that the next oldest batch of steep water is put on a body of fresh grain.

The process may be continued by cycles of operations corresponding to that above described. There is always one steep which is cut out of the system for grinding and one which is out for the purpose of filling. The steeping proceeds in the rest of the steeps except for short periods of time necessary for making the shift of liquor from one to the next.

It will be clear that instead of carrying out the process with two banks of steeps the whole battery might be operated in a single series. The difficulty is, however, that this requires complicated piping and also, in the case of a large battery, does not give sufficient time in any given cycle for making all of the changes. If the battery be very large it would be quite feasible to divide it into three or more banks.

I do not claim herein the apparatus shown and described as said apparatus is made the subject of a copending application Serial No. 606,894 filed February 6, 1911.

I claim:

1. The process of steeping grain in the manufacture of starch which consists in maintaining separate bodies of steeping liquid in contact for appreciable periods of time with separate bodies of grain and periodically changing the steep liquid from one body to another in such order that as the bodies of liquid become more concentrate with the soluble substances of the grain they are applied to grain relatively fresher.

2. The process of steeping grain in the manufacture of starch which consists in maintaining separate bodies of steeping liquid in contact for appreciable periods of time with separate bodies of grain, and periodically changing the steep liquid from one body to another in such order that as the bodies of liquid become more concentrate with the soluble substances of the grain they are applied to grain relatively fresher, and bringing the liquid withdrawn from grain previously steeped into contact successively with the fresh bodies of grain as the steeping of the other bodies is completed.

3. The process of steeping grain in the manufacture of starch which consists in maintaining separate bodies of steeping liquid in contact for appreciable periods of time with separate bodies of grain, periodically changing the steep liquid from one body to another in such order that as the bodies of liquid become more concentrate with the soluble substances of the grain they are applied to grain relatively fresher, and making the operation an endless one by withdrawing from the system the bodies of liquid as they reach the maximum concentration, bringing the bodies of liquid to the next degree of concentration into contact periodically with fresh bodies of grain, and at the same time cutting the fully steeped bodies of grain out of the system.

4. The process of steeping grain in the manufacture of starch which consists in bringing the steeping liquid successively into and maintaining it for appreciable periods of time in contact with a series of bodies of grain, periodically changing the steeping liquid from each of said bodies, except the last two bodies of said series (relative to the direction in which the liquid is moving), withdrawing out of the system the steeping liquid from the last of said series, withdrawing the liquid from the next to the last of said series and bringing it into contact with a body of fresh grain, and continuing the above described operation, moving the liquid from steep to steep and during the same interval of time cutting out of the system the fully steeped body of grain and introducing into the system the fresh body of grain.

5. The process of steeping grain in the manufacture of starch which comprises steeping a plurality of bodies of grain for different lengths of time and then subjecting said bodies to steeping operations in which the said bodies are kept in contact for appreciable periods of time with bodies of steeping liquid which are more dilute with the soluble substances of the grain in proportion to the length of time which the bodies of grain upon which they are used have steeped.

6. The process of steeping grain in the manufacture of starch which comprises subjecting a plurality of bodies of grain simultaneously to a succession of periodic steeping operations in which the fresh bodies of steeping liquid are brought into and maintained for appreciable periods of time in contact with the bodies of grain which have reached the last steeping stage, are then withdrawn from said bodies and brought into and similarly maintained in contact with the next fresh bodies of grain, and so on until they are finally withdrawn out of the system from bodies of grain freshly added to the system; the operations of withdrawing the liquid from one body taking place in the same periods of time during which the body of liquid previously withdrawn is returned to its next succeeding steeping operation.

7. The process of steeping grain in the manufacture of starch which consists in maintaining separate bodies of steeping liquid in contact for appreciable periods of time with separate bodies of grain and periodically changing the steep liquid from one body to another in such order that as the bodies of liquid become more concentrate with the soluble substances of the grain they are applied to grain relatively fresher, and maintaining separate circulations of said bodies of liquid through their respective bodies of grain while in contact therewith.

8. The process of steeping grain in the manufacture of starch which comprises steeping a plurality of bodies of grain for different lengths of time and then subjecting said bodies to steeping operations in which the said bodies are kept in contact for appreciable periods of time with bodies of steeping liquid which are more dilute with the soluble substances of the grain in proportion to the length of time which the bodies of grain upon which they are used have steeped, and maintaining separate circulations of said bodies of liquid through their respective bodies of grain while in contact therewith.

9. The process of steeping grain in the manufacture of starch which comprises subjecting a plurality of bodies of grain simultaneously to a succession of periodic steeping operations in which the fresh bodies of steeping liquid are brought into and maintained for definite periods of time in contact with the bodies of grain which have reached the last steeping stage, are then withdrawn from said bodies and brought into and similarly maintained in contact with the next fresh bodies of grain, and so on until they are finally withdrawn out of the system from bodies of grain freshly added to the system;

the operations of withdrawing the liquid from one body taking place in the same periods of time during which the body of liquid previously withdrawn is returned to its next succeeding steeping operation, and maintaining separate circulations of said bodies of liquid through their respective bodies of grain while in contact therewith.

10. The process of steeping grain in the manufacture of starch which consists in maintaining separate bodies of steeping liquid in contact for appreciable periods of time with a plurality of series of bodies of grain, changing the steep liquid from one body to another in one of the series, and then performing a like operation on the other series, in such order that as the bodies of liquid become more concentrated with the soluble substances of the grain they are applied to relatively fresher bodies of grain.

11. The process of steeping grain in the manufacture of starch which comprises maintaining separate bodies of steeping liquid in contact for appreciable periods of time with separate bodies of grain and treating said bodies in two or more banks, the bodies of steeping liquid being withdrawn from the bodies of grain in the first bank and introduced into other bodies of grain in said bank, in such order that the bodies of liquid as they become more concentrated are progressively brought into contact with fresher bodies of grain, and during this period maintaining the liquid in contact with the bodies of grain in the other bank without any change, and then allowing the first mentioned bank to steep without change and changing the liquid in the second bank in the manner described.

12. The process of steeping grain in the manufacture of starch which comprises maintaining a steeping liquid in contact with bodies of grain and treating said bodies in two or more banks, the steeping liquid being withdrawn from the bodies of grain in the first bank and introduced into other bodies of grain in said bank, in such order that the liquid as it becomes more concentrated is progressively brought into contact with fresher bodies of grain and during this period maintaining the liquid in contact with the bodies of grain in the other bank without any change, and then allowing the first mentioned bank to steep without change and changing the liquid in the second bank in the manner described.

13. The process of steeping grain in the manufacture of starch which comprises maintaining separate bodies of steep liquid for appreciable periods of time in contact with separate bodies of grain, then wholly withdrawing such bodies of liquid from said bodies of grain and thereafter introducing the same in contact with other bodies of grain relatively fresher, introducing the fresh liquid on the bodies of grain longest steeping and withdrawing the concentrated liquor from the freshest bodies of grain, cutting the bodies of grain successively out of the system when fully steeped, and adding thereto fresh bodies.

14. The process of steeping grain in the manufacture of starch which comprises maintaining separate bodies of steep liquid for appreciable periods of time in contact with separate bodies of grain, then wholly withdrawing such bodies of liquid from said bodies of grain and thereafter introducing the same in contact with other bodies of grain relatively fresher, introducing the fresh liquid on the bodies of grain longest steeping and withdrawing the concentrated liquor from the freshest bodies of grain, cutting the body of grain successively out of the system when fully steeped, adding thereto fresh bodies, and maintaining separate circulations of the liquid through the several bodies of grain during the steeping periods.

FREDRICK LESTER JEFFERIES.

Witnesses:
F. M. SAYRE,
A. N. HOMAN.